3,415,689
FLUOROCARBON BONDED SPINEL OXYGEN ELECTRODE
William N. Carson, Jr., Schenectady, and Randall N. King, Johnstown, N.Y., assignors to General Electric Company, a corporation of New York
No Drawing. Continuation-in-part of application Ser. No. 149,235, Nov. 1, 1961. This application Feb. 11, 1966, Ser. No. 526,687
17 Claims. (Cl. 136—120)

This application contains subject matter originally disclosed in our commonly assigned copending application, Ser. No. 149,235, filed Nov. 1, 1961, now abandoned.

This invention pertains to a porous electrode member containing a material which catalytically reduces oxygen. More particularly, the invention pertains to a porous electrode structure containing a spinel catalyst in combination with an electronic conductor for the purpose of reducing oxygen electrochemically in such devices as a battery, fuel cell, etc. Specifically, the invention pertains to particular combinations of a spinel catalyst with an electronic conductor which electrochemically reduce oxygen much much effectively than conventional oxygen electrodes.

Porous oxygen electrodes containing a spinel catalyst are known for electrochemically reducing oxygen and have proved generally superior to electrodes employing a catalyst of various sintered metals. In the conventional spinel electrode structures, a catalyst layer is prepared in situ on a porous graphite substrate by the decomposition of particular metal salts at elevated temperatures. In one method of preparation, the porous graphite substrate is impregnated with solutions of at least two salts stoichiometrically proportioned to form the spinel structure upon oxidation and the impregnated structure thereafter fired in an oxygen containing atmosphere at elevated temperatures in the range 700–1000° C. A known modification of this method exposes the impregnated graphite structures to direct heating in an oxygen-illuminating gas flame for a time period sufficient to form the spinel catalyst in the pores of the graphite member. The preparation of a spinel catalyst in the pores of a graphite member while providing a conducting electrode structure for the reduction of oxygen in a cell has many disadvantages. For example, formation of a uniform spinel composition is hampered by reduction of the metal salts and oxide reaction products with graphite and carbon monoxide. Additionally, the non-uniform porosity of available graphite materials promotes formation of a discontinuous catalyst layer of varying thickness which impede proper operation of the electrode. Poor adhesion of the catalyst to the graphite substrate is produced at the elevated temperatures and oxidizing conditions of catalyst formation whereby gases volatilized from the graphite disrupt the adhesive bond holding the catalyst to the substrate.

It is an important object of the invention, therefore, to provide a more efficient oxygen electrode structure with improved operating characteristics compared to prior art electrodes.

It is another important object of the invention to provide a simplified oxygen electrode having a self-supporting structure fabricated directly from a spinel catalyst and a conducting solid.

It is still another important object of the invention to provide an improved oxygen electrode comprising a porous support having a catalyst layer thereon which is composed of a combination of a spinel catalyst with a conducting solid.

It is still a further object of the invention to provide a method for the preparation of an improved oxygen electrode having a spinel for the active electrode material.

These and other objects of the invention will be apparent from the following description with the novel features believed characteristic of the present invention being set forth in the appended claims.

Briefly, the improved electrodes of the invention comprise a unitary porous structure obtained by bonding a particulate admixture of the spinel with a conducting solid into a self-supporting mass, or alternately, providing an adherent layer of the bonded admixture on a porous support.

With either arrangement, the electrochemical reduction of oxygen occurs substantially independent from any detrimental influence of a substrate. In other words, whereas the catalyst element of the prior art oxygen electrodes is intimately associated with a graphite support so that electrochemical reduction is hampered by the physical condition and chemical nature of the substrate, improved performance for the electrodes of the invention is achieved by restricting electrochemical reaction to a separate and distinct catalyst layer. The performance of an oxygen electrode constructed specifically to restrict electrochemical reaction to the catalyst portion of the electrode is surprising in view of the prior art statements that graphite itself will catalytically reduce oxygen even without the presence of a spinel catalyst. Thus, in the prior art methods there is an endeavor to produce the catalyst in a manner which also activates the graphite for improved current density in the product electrode. The electrodes of the invention as a class possess grreater thermal stability and mechanical stability as well as uniformly higher potentials at given current densities compared to the known electrodes.

Suitable admixtures for construction of the electrode are uniform solid mixtures of a preformed particulate spinel catalyst with sufficient amounts of a particulate conducting material to render the entire mixture electrically conducting. These admixtures may be conveniently compacted, sintered, or bonded into a unitary porous structure by conventional techniques because of the inert character of the active materials. On the other hand, preferred electrodes of the invention comprise a layer of the admixture suitably bonded to a porous support which permits construction of the electrode by simpler techniques and provides a more economical electrode structure. Consequently, a composite electrode may be fabricated with an inexpensive support element having adequate dimensions for structural stability and only so much of a costly catalyst layer as is necessary for satisfactory performance.

A useful composite electrode may be constructed with a catalyst layer having a thickness of $\frac{1}{32}$ inch or less, with the minimum thickness depending primarily upon the porosity of the layer so as to restrict the known three-phase gas-electrolyte-catalyst interface to the catalyst layer.

In one preferred embodiment of the invention, the catalyst layer is deposited on a silver grid support and subsequently bonded thereto to from a single unitary structure by action of a non-wettable binder in the catalyst admixture. Utilization of a non-wettable binder in the catalyst admixture minimizes "drowning" of the electrode during subsequent use. Drowning is a phenomenon whereby a liquid film of electrolyte covers the catalyst surface and prevents the sorption of oxygen gas thereon which must take place before the gas be electrochemically reduced. The grid structure employed for the support element of the electrode also minimizes drowning and generally obviates further need for water-proofing.

Another preferred embodiment deposits the catalyst admixture containing a non-wettable thermoplastic binder onto a porous graphite member and bonds the catalyst layer thereto by heating the assembly at elevated temperatures above the softening point of the thermoplastic binder but below reduction temperatures for graphite.

More particularly, a graphite member may be heated to temperatures below red heat without formation of gaseous reduction products that tend to disengage or dislodge the catalyst layer from the substrate. While the preferred electrodes prepared on a graphite support are not completely resistant to drowning during operation of the cell, the present electrodes constitute substantial improvement over water-proofed prior art electrodes.

The invention is illustrated in its preferred embodiments as described in the following examples and subsequent discussions thereon. Where parts and percentages appear hereinafter in the specification and claims, they are parts and percentages by weight unless otherwise specified.

EXAMPLE 1

A catalyst admixture was prepared by comingling approximately 10 parts cobalt aluminate ($CoAl_2O_4$), 90 parts flaked silver metal and 7 parts of a commercial aqueous 60 percent by weight polytetrafluoroethylene emulsion at room temperature until a uniform paste had been obtained. An approximately 1/32 inch thick layer of the paste was spread uniformly on a 1/8 inch thick graphite member having a porosity of approximately 20 percent. The final electrode was prepared by drying the pasted member in air at temperatures of approximately 200° C. for a period of about 15–20 minutes.

To measure electrode potentials for the oxygen electrode thus prepared, an electrolytic cell was constructed having a nickel anode, the oxygen electrode, and a 40 percent potassium hydroxide solution all disposed in a suitable container having provision for passing 99 percent oxygen from a tank source through the container. A mercury-mercuric oxide reference electrode was suitably connected to the oxygen electrode for measurement of potential from the oxygen electrode by a known pulse technique. By this method, a square wave pulse is fed to the test cell at 60 cycles per second. The oxygen electrode potential is measured during the off cycle of the pulse so that the internal resistance drop of the cell and the counter electrode EMF are eliminated in the voltage measurement. The mercuric oxide electrode used for the measurement was calibrated against a standard hydrogen electrode so that voltage reported for the oxygen electrode being tested is the difference between the voltage measured during the off cycle and the hydrogen reference voltage. The current density values reported are the observed average current of the pulse which is theoretically one-half of the pulse current. The output potential for the above prepared electrode at 50 milliamperes per square centimeter and 100 milliamperes per square centimeter loading was 0.85 and 0.72 volt, respectively.

EXAMPLE 2

An electrode admixture having the same composition as the admixture of Example 1 was prepared on a silver screen substrate having openings corresponding to approximately 80 mesh U.S. screen size. The preparation of the final electrode followed the same procedure described in Example 1. The output potential of the final electrode was measured and found to be 0.805 volt at 100 milliamperes per square centimeter current drain.

EXAMPLE 3

To illustrate still other catalyst admixtures within contemplation of the invention, an admixture consisting of 10 parts magnesium aluminate ($MgAl_2O_4$), 90 parts flaked silver metal, and 7 parts of the aqueous polytetrafluoroethylene binder was prepared and deposited on various substrates in accordance with the general method of Example 1. The performance of a composite electrode prepared with a porous silver mesh screen substrate measured 0.835 volt at a 50 milliampere per square centimeter current drain. A composite electrode prepared with the admixture on a porous carbon substrate measured 0.81 volt at 50 milliampere per square centimeter current drain.

EXAMPLE 4

Electrodes prepared from still other admixtures containing a different spinel catalyst in accordance with the invention also yielded improved results. An admixture prepared from 10 parts ferroso-ferric oxide ($Fe_3O_4$), 90 parts flaked silver metal, and 7 parts of the aqueous polytetrafluoroethylene binder bonded to a porous graphite support member yielded an electrode potential of 0.60 volt at 100 milliamperes per square centimeter current density.

EXAMPLE 5

The virtual absence of hysteresis during operation of the present electrodes with change in concentration of the electrolyte has been observed and offers some indication of the suitability of these structures over widely different conditions of operation. Table I lists electrode potentials for an electrode prepared in accordance with Example 1 in association with various concentrations of an aqueous potassium hydroxide electrolyte.

Table I

| Electrolyte (NKOH): | Electrode potential at 100 ma./cm.$^2$ |
|---|---|
| 2.86 | 0.82 |
| 4.50 | 0.82 |
| 5.77 | 0.815 |
| 6.74 | 0.805 |
| 7.48 | 0.795 |
| 8.12 | 0.785 |
| 8.76 | 0.777 |
| 9.21 | 0.765 |
| 10.44 | 0.738 |
| 11.52 | 0.692 |

It is apparent from the above measurements that an electrode structure made with a spinal catalyst according to the invention is effective over a wide range of electrolyte concentrations.

EXAMPLE 6

A comparison of electrical potentials for electrodes prepared according to the invention with conventional electrodes containing a spinel catalyst prepared in situ indicates the superiority of the present structures.

Certain conventional electrodes were prepared by soaking disks of porous carbon in a solution containing 0.1 molar concentration nickel nitrate together with 0.2 molar concentration ferric nitrate, thereafter drying the impregnated disks at 85° C. in air, and subsequently firing the dried products at elevated temperatures for decomposition of the nickel and ferric nitrates and formation of a presumed nickel-ferrate ($NiFe_2O_4$) spinel in the pores of the graphite substrate. The elevated firing conditions involved heating the disks for two minutes in an air circulated oven at 1100° C. or alternately, flaming the impregnated disk with an oxygen-gas torch. A final electrode structure was prepared by impregnating the fire disks with a 2 percent solution of paraffin wax in carbon tetrachloride and removing the solvent in a stream of air. Performance characteristics of the final electrodes measured in the same manner described in Example 1 are listed in Table II below under the designation "O" type electrode.

Other electrodes were prepared for comparison by a modified prior art method wherein the graphite support member was fired, then given an acid etching treatment prior to impregnation with the catalyst forming solution. The initial firing and etching treatment removed impurities and prepared fresh carbon surfaces for subsequent reaction with the decomposable metal salts to form the catalytically active member. Accordingly, graphite disks were fired at approximately 900° C. in a carbon dioxide atmosphere for approximately two hours, then soaked in a 1:1 nitric acid solution at 30–50 C. for about three hours, which was followed by air drying and a final firing pretreatment at 400° C. in air to remove residual nitric acid. The pretreated disks were then impregnated with an aqueous solution containing 6.2 grams of aluminum nitrate and 2.4 grams of cobaltous nitrate diluted to 100 milliliters of aqueous solution. The impregnated disks were dried in air and fired at 800–900° C. for two minutes in air, presumably forming cobalt aluminate spinel in the open pores of the graphite member. Additional electrodes were made by this method with a different impregnating solution comprising 7.2 grams of a 1:1 aqueous manganese nitrate solution, 32.4 grams ferric nitrate, 6.8 grams of silver nitrate diluted to 100 milliliters of solution which upon decomposition forms silver manganese ferrate in situ. The final electrodes were water-proofed by the method hereinbefore described to minimize drowning. The electrical potentials of the electrodes prepared by etching pretreatment are listed in Table II under "M" type electrodes.

Various electrodes prepared according to the invention with a preformed catalyst material were measured for electrical potential by the general method of Example 1 and the results are listed in the table under "G" type electrodes. The electrodes were fabricated by bonding a layer of the catalyst admixture on one major surface of the same type graphite disks employed for preparation of the "M" and "O" electrodes. Certain of the electrodes were prepared having a catalyst layer obtained from an admixture of a cobaltous aluminate spinel with powdered carbon and a synthetic organic polymer binder. The carbon and spinel components of the mixture had the same general chemical composition as certain of "M" type electrodes but it will be apparent from the improved results obtained from the present electrodes that a different physical combination of these components imparts different operating characteristics to the product. All of the "G" type electrodes were prepared according to the general method of Example 1 having particular catalyst admixtures listed in the table. The electrical potentials measured for the comparison include open circuit potentials as well as load potentials to demonstrate the generally lower internal resistance of electrodes made in accordance with the invention.

The improved electrodes of the invention comprise a bonded porous mass of the catalyst admixture particles which may be in the form of self-supporting structures or a surface layer supported on a porous substrate. The catalyst layer is electrically conducting by reason of the presence of sufficiently electronically conducting solid particles to form a substantially continuous network throughout the catalyst layer. The necessary degree of porosity for the catalyst layer will be determined by operating conditions for the reduction of oxygen which in every instance requires diffusion of oxygen into the catalyst layer to establish a three-phase reaction zone in the catalyst layer, sorption of the diffused oxygen on the catalyst surface, and electro-chemical reduction of the sorbed gas.

If the oxygen electrode is employed in a normal type accumulator device, the required degree of porosity for the catalyst layer is that permitting capillary diffusion of oxygen which can be accomplished with such well-known type structures as disclosed by A. Schmid, in "Helv, Chem.

TABLE II

| Electrode type | Spinel catalyst | Open circuit voltage ($E_0$) | Voltage at indicated ma./cm.$^2$ | | | | | | | | Remarks |
|---|---|---|---|---|---|---|---|---|---|---|---|
| | | | 1 | 2 | 5 | 10 | 20 | 50 | 100 | 200 | |
| O | NiFe$_2$O$_4$ | 1.03 | 0 | | | | | | | | (1) |
| O | NiFe$_2$O$_4$ | 1.14 | | | | | | | | | (2) |
| O | NiFe$_2$O$_4$ | 1.01 | 0.49 | | | | | | | | |
| M | CoAl$_2$O$_4$ | 0.99 | 0.80 | 0.73 | 0.59 | 0.47 | 0.35 | | | | |
| M | CoAl$_2$O$_4$ | 1.01 | 0.75 | 0.45 | | | | | | | |
| M | (Ag$_2$, Mn)Fe$_2$O$_4$ | 1.04 | 0.57 | | | | | | | | |
| G | CoAl$_2$O$_4$ | 1.06 | 0.96 | 0.46 | | | | | | | (3) |
| G | CoAl$_2$O$_4$ | 1.0 | | | 0.84 | 0.80 | 0.76 | 0.69 | 0.63 | 0.57 | (4) |
| G | CoAl$_2$O$_4$ | 1.06 | 1.02 | 1.0 | 0.96 | 0.92 | 0.86 | 0.77 | 0.67 | 0.53 | (5) |
| G | CoAl$_2$O$_4$ | 1.07 | | 0.99 | 0.96 | | | | | 0.69 | (6) |

$^1$ Drowned after a few minutes operation.
$^2$ Drowned before load could be stabilized.
$^3$ Admixture of 10 parts carbon, 5 parts spinel, 1 part silver metal, rubber cement.
$^4$ Admixture of 50 parts carbon, 50 parts spinel, polytetrafluoroethylene emulsion.
$^5$ Admixture of 50 parts silver metal, 50 parts spinel, polytetrafluoroethylene emulsion.
$^6$ Admixture of 75 parts silver metal, 25 parts spinel, polytetrafluoroethylene emulsion.

Acta," vol. 7, p. 373 (1924). Catalyst admixtures prepared with spinels having a particle size of −50 mesh U.S. screen size and smaller dispersed in conducting solids having a particle size through 200-mesh U.S. screen size provide a capillary diffusion structure when bonded with a particulate binder in the proportions hereinbefore mentioned. On the other hand, if the electrode is to be used in a fuel cell operated normally at gas pressures of several atmospheres, the porosity of the catalyst layer may be adjusted to suit somewhat different requirements. More particularly, a microporous structure having graded pore sizes arranged so as to have a layer on the gas side containing larger pores than on the electrolyte side is better suited for fuel cell applications than the capillary diffusion structure previously described. Various catalyst systems having this characteristic are known, some of which being identifiable by such terms as "homoporous," "double skeleton," and "equilibrium" electrode structures. Reference is made for a more detailed description of how the catalyst admixtures of the invention may be prepared in such configurations to various sections in the text, "Fuel Cells," by K. J. Young, Reinhold Publishing Corporation (1960), relating to gas diffusion electrodes.

Useful spinel materials for the catalyst admixtures can be selected from the broad class of metal oxide mixtures having a crystalline structure of mineral spinel, magnesium aluminate (MgAl$_2$O$_4$) and which are also chemically stable under the highly oxidizing ambient cell conditions. By "stable" it is meant those spinel materials which are chemically inert to the cell electrolyte and oxygen in the cell at operation temperatures. Since spinels are oxide materials which constitute a relatively stable class of compounds per se, it will be realized that the useful spinels represent a broad class of materials. Selection of a particular catalyst for any given application may perhaps best be based upon such considerations as suitability of the material in fabrication and compatability of the material with other components of the electrode. While certain of the spinels tested produce better electrode potentials than others, all electrodes made according to the invention with a spinel material have exhibited substantial improvement over the prior art structures.

Spinels can be divided crystallographically into two classes, namely, the normal type structure $XY_2O_4$ and the inverse type structure $Y(XY)O_4$, both which are useful in the practice of the invention. In simple spinels, the valencies of the cations may be either a value of 2 with Y being 3, or X equals 4, while Y equals 2. A third possible cation combination occurring but rarely in simple spinels is X equals 6, Y equals 1. The spinel structure can most readily be described on the basis of the unit cell which contains 32 oxygen atoms in a cubic closed-pack arrangement. Such a structure presents two types of interstitial sites where there are four or six adjacent oxygen atoms, these sites being termed "tetrahedral" and "octahedral" sites, respectively. There are 64 possible tetrahedral sites and 32 octahedral sites with the cations being distributed among these in such a manner that normally 8 tetrahedral and 16 octahedral sites are occupied. For a normal spinel, the X atoms or ions occupy the tetrahedral sites and the Y atoms or ions occupy the octahedral interstices. In contrast thereto, in the inverse spinel the tetrahedral interstices are occupied by one-half of the Y ions while the remainder of the Y cations together with the X cations occupy the octahedral sites. Useful normal type spinels include the ferrites such as zinc ferrite ($ZnFe_2O_4$), cadmium ferrite ($CdFe_2O_4$), cobalt ferrite ($CoFe_2O_4$), and nickel ferrite ($NiFe_2O_4$); the aluminates, such as cobalt aluminate ($CoAl_2O_4$), nickel aluminate ($NiAl_2O_4$), and magnesium aluminate ($MgAl_2O_4$); and the chromites, such as cobalt chromite ($CoCr_2O_4$), nickel chromite ($NiCr_2O_4$), and copper chromite $$(CuCr_2O_4)$$

Useful inverse type spinels include certain ferrites, such as $Fe_3O_4$ together with the ferric spinels of manganese, cobalt, nickel, copper, and magnesium, as well as magnesium titanite ($Mg_2TiO_4$) and ferric titanite ($Fe_2TiO_4$). For a more detailed description of the various possible X and Y cation combinations in common, normal, and inverse type spinels, reference is made to "The Defect Solid State" by T. J. Gray, Interscience Publishers, Inc., pp. 201–204 (1957).

Simple type spinels are preferred because of the ease with which homogeneous compositions may be prepared. More particularly, the catalytic properties of a spinel are particularly sensitive to the homogeneity and ion content of the material. The simple type spinels may be prepared by ordinary ceramic techniques wherein stoichiometric proportions of the oxides are mixed together, then fired with additional refining and refiring being employed to obtain maximum homogeneity. In the normal firing technique one or more of the oxides are generally sintered in air although satisfactory spinels have been formed at firing temperatures below the sintering temperature by solid state reaction between the constituents. While satisfactory products may be obtained with heating in air, avoidance of reducing conditions is necessary to maintain the proper oxidation state of the products. Suitable catalysts may also be formed by decomposition of salt mixtures in air at the elevated temperatures of spinel formation. Example 7 below illustrates the method of spinel formation from metal salts initially dissolved in solution.

EXAMPLE 7

An aqueous solution was first prepared by dissolving 6.2 grams of aluminum nitrate and 2.4 grams of cobaltous nitrate in approximately 100 milliliters of water. The solution was thereafter evaporated to dryness in a glass beaker over a gas flame. The dried salt mixture was then calcined slowly over a gas flame until most of the salt decomposed to the metal oxide. The partially calcined oxide mixture was then ground to about −20 mesh and fired in air at 500° C. for periods of up to two hours. The calcined spinel product was cooled, then ground to about approximately −50 mesh or finer and used without further treatment in the catalyst admixtures of the invention.

While formation of the spinel structure from certain oxide mixtures having elevated sintering temperatures, such as chromite spinel-forming mixtures, may require heating to temperatures of 1200–1400° C. and higher, excessive heating of an already formed spinel catalyst may actually reduce the catalytic activity of the material. Hence, heating of the cobalt aluminate spinel formed according to the present example to temperatures of 1000–1100° C. results in decreased catalyst activity.

Suitable particulate electronic conductors for the catalyst admixtures can be selected from the broad class of conducting solids which are inert and compatible in the mixture. By "inert" is meant those materials which do not react with the catalyst, are not attacked by the highly oxidizing conditions at the electrode during operation, and are not dissolved in contact with an electrolyte. By "compatible" is meant those conducting solids which have physical properties suitable for the particular method of preparation selected for fabrication of the electrode. More particularly, where it is desired to prepare an electrode by pressing or sintering the particulate admixture, the conducting solid must not comprise a low melting point, easily fusible material so as to minimize formation of an impervious mass. Additionally, the conducting solid must be capable of bonding to the refractory spinel material for the preparation of a final adhered structure. On the other hand, low melting conducting solids may be employed for the preparation of a porous catalyst layer if bonding is obtained with a separate binder agent. Electronic conducting solids are well known and suitable materials for admixture with the catalyst include such diverse materials as metals, such as copper, silver, nickel, platinum, palladium, and cobalt; metallic alloys such as silver, copper, and aluminum alloys; and even non-metals such as carbon and conducting metal oxides such as tin oxide or carbon but which has been activated with oxides of iron, manganese, cobalt, copper, etc.

Suitable binders for use in the electrode structures of the invention are well known and can be selected from the class of inert organic and inorganic materials which are capable of adhesively bonding the solids in the admixture into a unitary porous structure. The preferred binders are non-wettable synthetic organic polymers so as to water-proof the final electrode. Especially preferred binders comprise particulate thermoplastics which bond the admixture particles by point contact rather than by coating so as not to substantially reduce the catalytic surface area in the electrode. Exemplary preferred binders are linear fluorocarbon polymers, such as polytetrafluoroethylene, polyvinylidene fluoride, polychlorotrifluoroethylene, etc.

From the above description, it is apparent that a new type oxygen electrode structure has been showing having improved performance characteristics. It is not intended to limit the invention to the preferred embodiments above shown, since it will be obvious to those skilled in the art that certain modifications of the present teaching can be made without departing from the true spirit and scope of the invention. It is intended to limit the present invention, therefore, only to the scope of the following claims.

What we claim as new and desire to secure by Letters Patent of the United States is:

1. An oxygen electrode comprised of an electrocatalytic, conductive composition consisting essentially of
    discrete particles of an inert conductive solid,
    discrete particles of a spinel, and
    a non-wettable, linear fluorocarbon thermoplastic polymer binder,
    said discrete particles of said inert conductive solid, said discrete particles of said spinel, and said polymer binder being uniformly distributed throughout said composition.

2. An oxygen electrode according to claim 1 in which said spinel is a normal spinel.

3. An oxygen electrode according to claim 2 in which said normal spinel is cobalt aluminate.

4. An oxygen electrode according to claim 2 in which said normal spinel is magnesium aluminate.

5. An oxygen electrode according to claim 1 in which said spinel is an inverse spinel.

6. An oxygen electrode according to claim 5 in which said inverse spinel is ferroso-ferric oxide.

7. An oxygen electrode according to claim 1 in which the electrode is porous.

8. An oxygen electrode according to claim 1 in which said binder is polytetrafluoroethylene.

9. An oxygen electrode comprised of
a porous conductive support and
an electrocatalytic, conductive composition bonded to a surface of said support consisting essentially of
discrete particles of an inert conductive solid,
discrete particles of a spinel, and
a non-wettable, linear fluorocarbon thermoplastic binder,
said discrete particles of said inert conductive solid, said discrete particles of said spinel, and said polymer binder being uniformly distributed throughout said composition.

10. An oxygen electrode according to claim 9 in which said spinel is a normal spinel.

11. An oxygen electrode according to claim 10 in which said normal spinel is cobalt aluminate.

12. An oxygen electrode according to claim 10 in which said normal spinel is magnesium aluminate.

13. An oxygen electrode according to claim 9 in which said spinel is an inverse spinel.

14. An oxygen electrode according to claim 13 in which said inverse spinel is ferroso-ferric oxide.

15. An oxygen electrode according to claim 9 in which said binder is polytetrafluoroethylene.

16. An oxygen electrode according to claim 9 in which said porous conductive support is graphite.

17. An oxygen electrode according to claim 9 in which said porous conductive support is a metal screen.

References Cited

UNITED STATES PATENTS

| | | | |
|---|---|---|---|
| 3,297,484 | 5/1961 | Niedrach | 136—86 |
| 2,669,598 | 2/1954 | Marko et al. | 136—120 |
| 3,252,839 | 5/1966 | Langer et al. | 136—122 |
| 2,642,514 | 6/1953 | Herkenhoff | 260—37 X |
| 3,113,048 | 12/1963 | Thompson | 136—120 X |
| 3,116,169 | 12/1963 | Thompson. | |

WINSTON A. DOUGLAS, *Primary Examiner.*

O. F. CRUTCHFIELD, *Assistant Examiner.*

U.S. Cl. X.R.

136—121